Feb. 2, 1960 — W. G. ROLLINS — 2,923,138
QUICK FREEZING APPARATUS

Filed May 31, 1957 — 2 Sheets-Sheet 1

INVENTOR
WILBUR ROLLINS
BY A. Yates Dowell
ATTORNEY

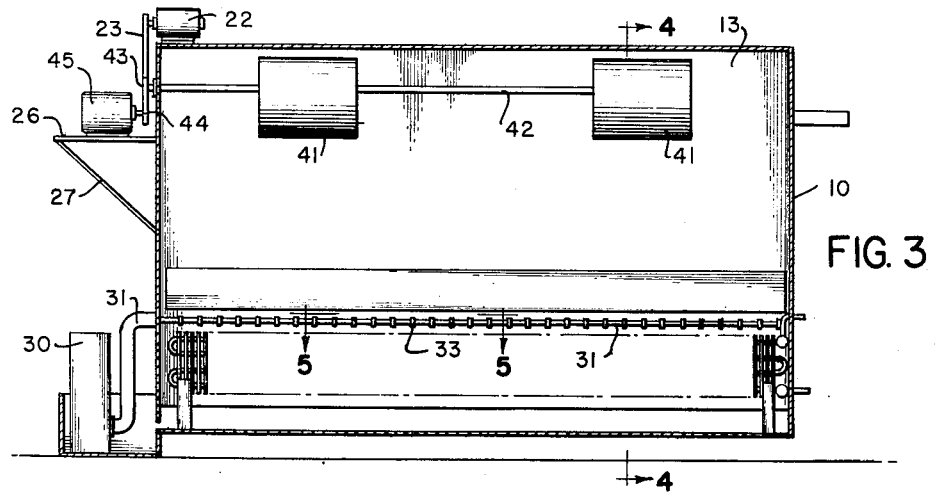
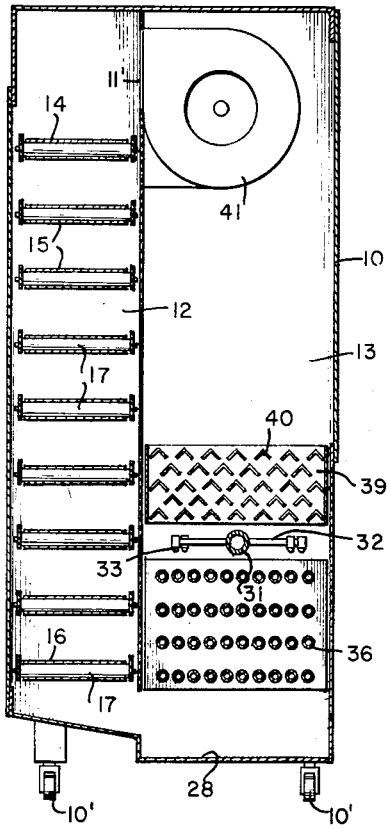
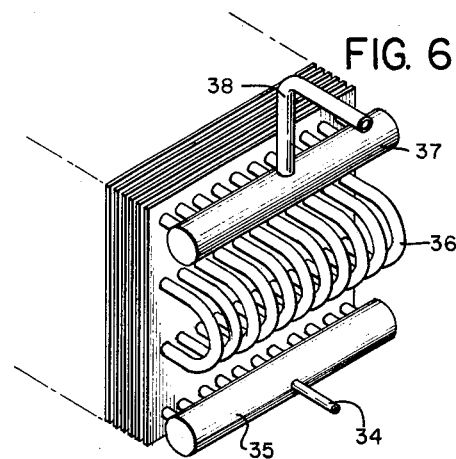
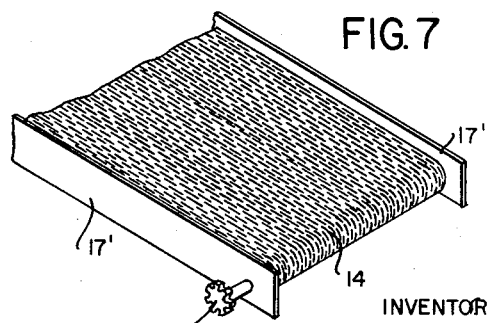

United States Patent Office 2,923,138
Patented Feb. 2, 1960

2,923,138

QUICK FREEZING APPARATUS

Wilbur G. Rollins, Pampano Beach, Fla.

Application May 31, 1957, Serial No. 662,884

1 Claim. (Cl. 62—282)

This invention relates to the care and preservation of commodities of any desired character, for example, foods for human consumption and includes the modification of temperature in order to produce the desired result.

The invention relates particularly to refrigeration apparatus used for the cooling of commodities to the desired degree including to the point of freezing such commodities as perishable foods and other things and to the accomplishment of such result quickly or slowly as preferred.

Various methods have been employed for the freezing of foods including by subjecting material to be frozen direct to the cooling fluid in a form either of vapor or liquid, or both, or by removing the heat by conduction. Prior devices have not been satisfactory because they were complicated, bulky, expensive to produce and maintain, inefficient, and required too much time in accomplishing the result sought.

It is an object of the invention to overcome the difficulties enumerated and to provide relatively simple, inexpensive, compact, and efficient refrigeration apparatus capable of removing heat sufficiently to produce freezing in a relatively short period of time.

Another object of the invention is to provide the cooling portion of refrigeration apparatus in a self-contained, compact, portable unit into which the material to be refrigerated may be inserted and caused to travel in a zigzag or sinuous path to permit the necessary heat exchange and then be discharged from the apparatus.

A further object of the invention is to provide a device of the character indicated in which a series of foraminous belts are disposed one above the other for carrying material to be refrigerated back and forth through a chamber into which cool dry air is caused to circulate, such air being refrigerated by means of cooling coils and a brine spray.

Figure 1:
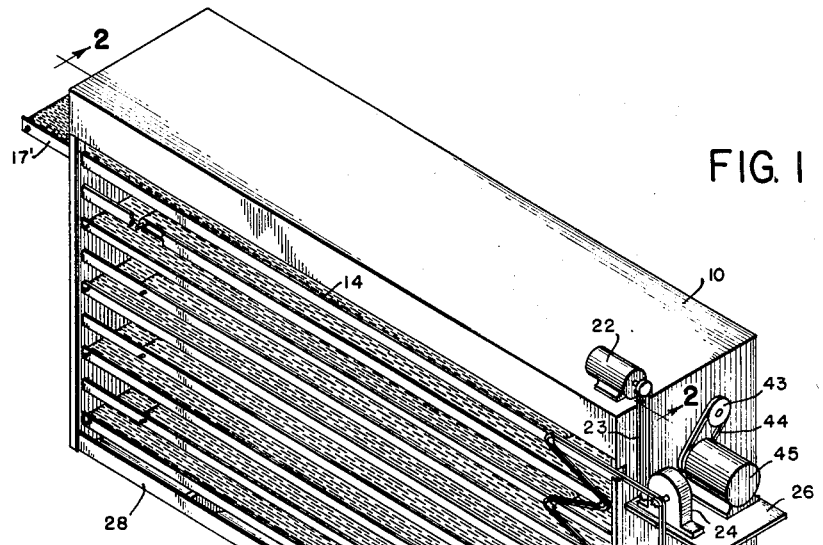
Figure 5:
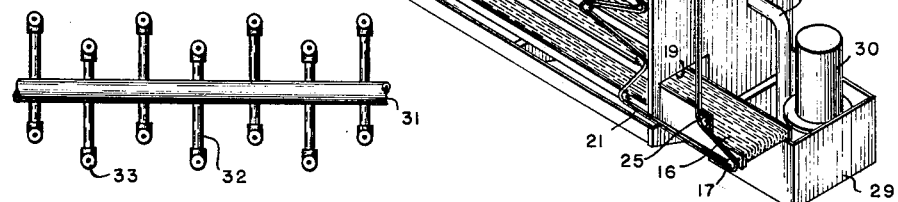
Figure 2:
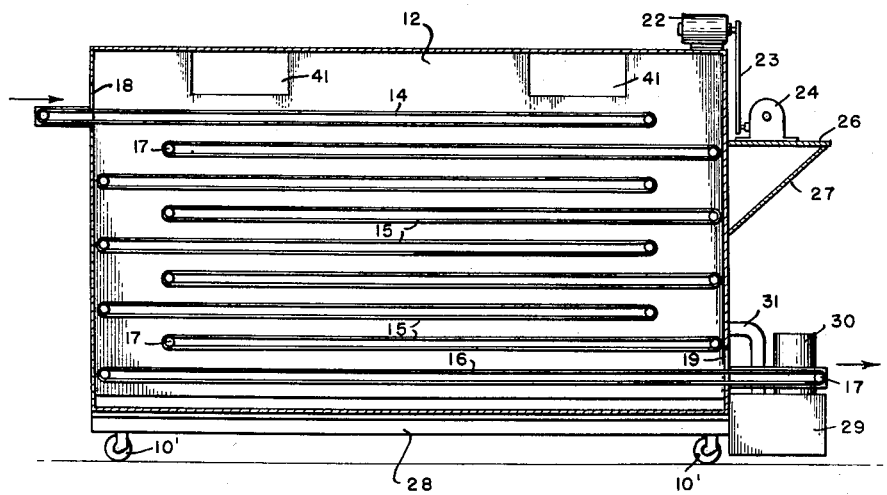

Other objects and advantages of the invention will be apparent from the following description taken in conjunction with the accompanying drawings wherein:

Fig. 1 is a perspective illustrating one application of the invention;

Fig. 2, a vertical section on the lines 2—2 of Fig. 1;

Fig. 3, a rear elevation with the cover removed;

Fig. 4, a vertical transverse section on the line 4—4 of Fig. 3;

Fig. 5, a fragmentary detail view of the spray nozzles viewed from the line 5—5 of Fig. 3;

Fig. 6, an enlarged fragmentary perspective of one end of the coils of the cooling unit; and Fig. 7, an enlarged fragmentary perspective of the end of one of the conveyor belts.

Briefly stated, the invention comprises a housing having a pair of chambers side by side in one of which a series of foraminous conveyor belts are located in spaced relation one above the other and offset endwise so that material placed on the upper belt will travel from one to another over each of the belts until finally discharged from the chamber, the latter being supplied with refrigerated air which cools the material travelling therethrough.

In the other of the pair of chambers are located cooling coils and a brine spray for cooling the air for producing the refrigerating effect in the adjacent chamber, a moisture eliminator being disposed in the chamber above the cooling coils and brine spray for removing excess moisture from the refrigerated air, blowers being provided for circulating the refrigerated air into the chamber containing the belts and downwardly therethrough. Also a pump is provided for re-circulating the brine and driving means for such pump and for driving the conveyors.

With continued reference to the drawings the present invention comprises a housing 10 supported on casters 10', having a vertical partition 11 providing chambers 12 and 13 extending from top to bottom of the housing at each side of the same, the chamber 12 is slightly narrower than the chamber 13 and is provided with a series of substantially horizontally disposed foraminous wire mesh conveyor belts 14, 15 and 16 supported on suitable pulleys 17 and located one above the other between side bars 17' with their extremities offset to cause material deposited on the top belt to travel back and forth over the several belts until it is discharged from the lowermost belt.

The upper conveyor 14 extends through an inlet opening 18 (Fig. 2) so that material can be placed upon the belt outside of the apparatus and carried into the apparatus on such belt and after it has travelled along the several belts through the chamber it will be discharged through an opening 19 (Figs. 1 and 2) into which the conveyor discharges material from the apparatus. The arrangement of the conveyor belts in the manner described provides a compact structure.

The several conveyors are driven by sprockets 20 on the ends of the pulleys 17 by a chain 21 from a motor 22, a belt drive 23 and a chain speed reduction gearing 24. In order to permit the discharge end of the conveyor to project beyond the casing, an idler sprocket 25 similar to sprockets 20 may be employed.

The motor 22 and gearing 24 may be supported on the apparatus in any desired manner as for example respectively the motor upon the housing 10 and the gearing upon a shelf 26 supported by brackets 27. The length of time of the travel of an article through the apparatus may be controlled. The necessary dwell of the product subjected to refrigeration effect may be varied by varying the speed of the driving motor 22 or the ratio of the pulleys between the motor and the reduction gearing or the ratio of such gearing.

In order to cool material supported on the wire mesh conveyor belts air is refrigerated and caused to pass over and downwardly through such belts and over and around the material thereon. The conveyor belts are in the smaller chamber 12 of the apparatus while the cooling apparatus and associated parts are in the larger chamber 13.

The bottom of the housing 10 forms a drain pan 28 which empties into a pump well or sump 29 in which is disposed a brine pump 30 which pumps brine into an insulated brine spray pipe 31 (Fig. 5), lateral arms 32 and nozzles 33 over a serpentine cooling coil such coil including an inlet 34 connected to an inlet header 35 which fits a series of finned serpentine coils 36 which terminate in a suction header 37 connected to the suction line 38 of the system where the vaporous refrigerant is compressed, condensed and supplied through the pressure line 34 to the inlet header 35.

Brine sprayed over the finned coils will be cooled thereby and the air in contact with the coils and the brine spray will be refrigerated. In order to remove excess moisture an eliminator 39 may be provided including a series of baffles 40 disposed in such proximity that there is little space for air to pass between them.

In order to produce forced circulation of air through the apparatus a pair of blowers 41 are provided of the sirocco type, such blowers being mounted on a common shaft 42 having one end extending exteriorly of the housing over the shelf 26 and provided with a pulley 43 driven by a belt 44 from a motor 45 removably mounted on the shelf 26. The blowers 41 discharge air through openings 11' in the partition 11.

From the foregoing it will be apparent that the present invention is a portable unit for connection with the compressor condenser elements of a refrigeration system or other source of refrigerant not shown, refrigerant being supplied to the cooling coil 36 through which it travels and absorbing heat from the surrounding air and brine sprayed thereover through the nozzles 33 with excess moisture removed by the eliminator 39 as the refrigerated air being forced by the blowers 41 downwardly over the conveyor belts and re-circulated as described.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

Refrigeration apparatus comprising a housing having chambers in upright side by side relation, a series of substantially horizontally disposed conveyors located one above the other in one of said chambers, said conveyors being of open work construction through which air can readily pass in a vertical direction while articles are supported thereon, said conveyors being of a width substantially coextensive with the width of the chamber in which they are located, means for driving said conveyors to cause material deposited on the upper of said conveyors to travel lengthwise of each conveyor beginning with the uppermost and progressing to the lowermost, an evaporator mounted in the lower portion of the other of said chambers, brine spraying apparatus for spraying brine over said evaporator, baffle means mounted above said evaporator for removing any liquid droplets carried in the air, means for collecting and recirculating the brine over said evaporator, and blower means for circulating the air over said coils through said baffle means and vertically through said conveyors and back to said coils.

References Cited in the file of this patent

UNITED STATES PATENTS

| | | |
|---|---|---|
| 1,832,912 | Moore | Nov. 12, 1931 |
| 1,998,912 | Troy | Apr. 23, 1935 |
| 2,065,358 | Zarotschenzeff | Dec. 22, 1936 |
| 2,162,213 | Conn | June 13, 1939 |
| 2,237,257 | Finnegan | Apr. 1, 1941 |
| 2,385,140 | Knowles | Sept. 18, 1945 |
| 2,537,390 | Baker | Jan. 9, 1951 |
| 2,563,278 | Rummel | Aug. 7, 1951 |
| 2,751,687 | Colton | June 26, 1956 |
| 2,878,776 | Vogel | Mar. 24, 1959 |